(12) United States Patent
Hangleiter

(10) Patent No.: US 6,568,888 B2
(45) Date of Patent: May 27, 2003

(54) COLLET CHUCK

(75) Inventor: Eugen Hangleiter, Hermaringen (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/930,922

(22) Filed: Aug. 16, 2001

(65) Prior Publication Data

US 2002/0053770 A1 May 9, 2002

(30) Foreign Application Priority Data

Aug. 17, 2000 (DE) .......................................... 100 40 638

(51) Int. Cl.$^7$ ................................................. B23C 5/26
(52) U.S. Cl. ........................ 409/233; 279/2.02; 82/160; 409/234
(58) Field of Search ............................ 279/2.02, 2.03, 279/2.14, 2.15, 2.24, 141; 408/239 R, 239 A, 240; 82/160, 169; 269/48.1; 409/232–234; 294/86.24, 86.25, 93

(56) References Cited

U.S. PATENT DOCUMENTS

| | | | | |
|---|---|---|---|---|
| 4,135,848 A | * | 1/1979 | Hughes et al. ........... | 408/239 A |
| 4,844,671 A | * | 7/1989 | Reinauer ................... | 409/233 |
| 4,997,325 A | * | 3/1991 | Heel et al. ................. | 409/233 |
| 5,346,344 A | * | 9/1994 | Kress et al. ............... | 409/234 |
| 5,851,093 A | * | 12/1998 | Erickson .................... | 409/234 |
| 5,865,578 A | * | 2/1999 | Benedikter et al. ........ | 409/233 |
| 6,419,430 B2 | * | 7/2000 | Hangleiter ................. | 409/233 |
| 6,309,150 B1 | * | 10/2001 | Hangleiter ................. | 409/233 |

FOREIGN PATENT DOCUMENTS

DE          41 38 974          6/1993

* cited by examiner

*Primary Examiner*—Steven C. Bishop
(74) *Attorney, Agent, or Firm*—Herbert Dubno; Andrew Wilford

(57) ABSTRACT

A collet chuck for holding a mounting collar of an object—tool or workpiece—to be rotated has a chuck body centered on and rotatable about an axis and formed with a forwardly open socket shaped to receive the collar. A plurality of jaws in the socket have front ends engageable inside the collar in the socket and rear ends. The jaws are angularly spaced and defining axially extending and radially inwardly open slots. A setting sleeve has a front cam surface engageable with inner faces of the front ends of the jaws so that the sleeve can cam out the front ends to lock the jaws to the collar in the socket. The sleeve is formed with radially outwardly projecting and axially extending ribs each received in a respective one of the slots.

15 Claims, 7 Drawing Sheets

COLLET CHUCK

FIELD OF THE INVENTION

The present invention relates to a chuck. More particularly this invention concerns a collet chuck for attachment to a mounting collar of a workpiece to be machined or of a tool.

BACKGROUND OF THE INVENTION

A standard collet chuck for attachment to a mounting collar of a tool or workpiece has a body formed centered on an axis with a forwardly open socket shaped to coaxially receive the mounting collar. A collet inside the body has a plurality of jaws with front ends that project axially forward into the collar. The jaws can rock to move the front ends radially outward to engage behind an axially forwardly directed shoulder of the collar and thereby lock the collar to the chuck body. Each jaw can pivot in the body about a respective axis extending in a plane perpendicular to the axis and offset therefrom. An axially displaceable cam sleeve inside the body has a radially outwardly directed front cam surface engageable with front inside faces of the front ends of the jaws and a radially outwardly directed rear cam surface engageable with rear inside faces of rear ends of the jaws. Thus, when displaced axially rearward, the cam sleeve spreads the front ends of the jaws to hold the workpiece and, when displaced axially forward, rocks these front ends inward to release the workpiece. Such a chuck is described in German patent document 4,138,974 of E. Brangs.

In such a system it is possible for the cam sleeve and the jaws to move into slightly offcenter positions. The chuck will hold the workpiece adequately with the parts offcenter, but will be somewhat eccentrically off balanced. Since it is not uncommon for such a chuck to rotate at very high speed, as much as 40,000 RPM, even a minor imbalance can create a problem, for instance a vibration that ruins the machining job.

OBJECTS OF THE INVENTION

It is therefore an object of the present invention to provide an improved collet chuck.

Another object is the provision of such an improved collet chuck which overcomes the above-given disadvantages, that is which maintains its cam sleeve on center at all times.

SUMMARY OF THE INVENTION

A collet chuck for holding a mounting collar of an object—tool or workpiece—to be rotated has according to the invention a chuck body centered on and rotatable about an axis and formed with a forwardly open socket shaped to receive the collar. A plurality of jaws in the socket have front ends engageable inside the collar in the socket and rear ends offset axially rearwardly therefrom. The jaws are angularly spaced and define axially extending and radially inwardly open slots. A setting sleeve has a front cam surface engageable with inner faces of the front ends of the jaws so that the sleeve can cam out the front ends to lock the jaws to the collar in the socket. The sleeve is formed with radially outwardly projecting and axially extending ribs each received in a respective one of the slots.

Thus with this system the ribs keep the sleeve and jaws perfectly in position in the chuck body. The jaws in particular cannot shift angularly, and the sleeve is rotationally locked to the jaws and also centered by them. The result is a perfectly balanced chuck that can be rotated at high speed with no vibration or throw. The ribs can be axially quite long, basically extending axially from the front jaw ends at least to the middle of the jaws.

According to the invention the chuck body is formed axially rearward of the socket with a radially inwardly open groove centered on the axis and each jaw has a rear end received and radially displaceable in the groove. The setting sleeve has a rear cam surface engageable with inner faces of the rear ends of the jaws so that the sleeve can cam out the rear ends to move the front ends radially inward and axially clear of the collar in the socket. Each of the ribs is of an angular dimension increasing outward from the axis so as to stay on center regardless of the positions of the jaws, basically of an inverted Y-shape. Further each of the ribs extends at least from the axial rear edge of the front cam surface to the axial front edge of the rear cam surface to keep all the parts aligned. The ribs are produced by milling after the basic cam sleeve has been made by turning, for a relatively low production cost.

According to the invention a spring engaged around the rear ends of the jaws urges the jaw front ends radially outward. The rear ends form a radially outwardly open groove receiving the spring. This spring has spacer blocks engaged in the slots and braced angularly against the jaws so that the spacer blocks angularly space and separate the jaws. As a result the subassembly formed by the spring and jaws can easily be installed in the chuck body simply by pushing it axially rearward into the socket until the rear ends align with the groove. Subsequent insertion of the sleeve completes the assembly and makes it impossible for the jaws to pull axially out of the chuck body.

The sleeve according to the invention is formed axially rearward of the rear cam surface with a cylindrical holding surface centered on the axis and engageable with the jaw rear ends to retain same in a freeing position with the jaw front ends shifted inward. Thus when the sleeve is shifted all the way forward it first cams out the rear ends with its frustoconical rear cam surface, then holds them in the outer position without having to maintain an axial force on the sleeve. Thus the chuck can be locked in the open position.

The groove has an axially rearwardly directed flank engaging the jaw rear ends. This flank has a radially outer portion lying substantially in a plane perpendicular to the axis and a frustoconical radially inner portion inclined at about 10° to the plane. As a result the jaws shift somewhat axially rearward as the rear ends move radially inward, providing a very strong connection.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
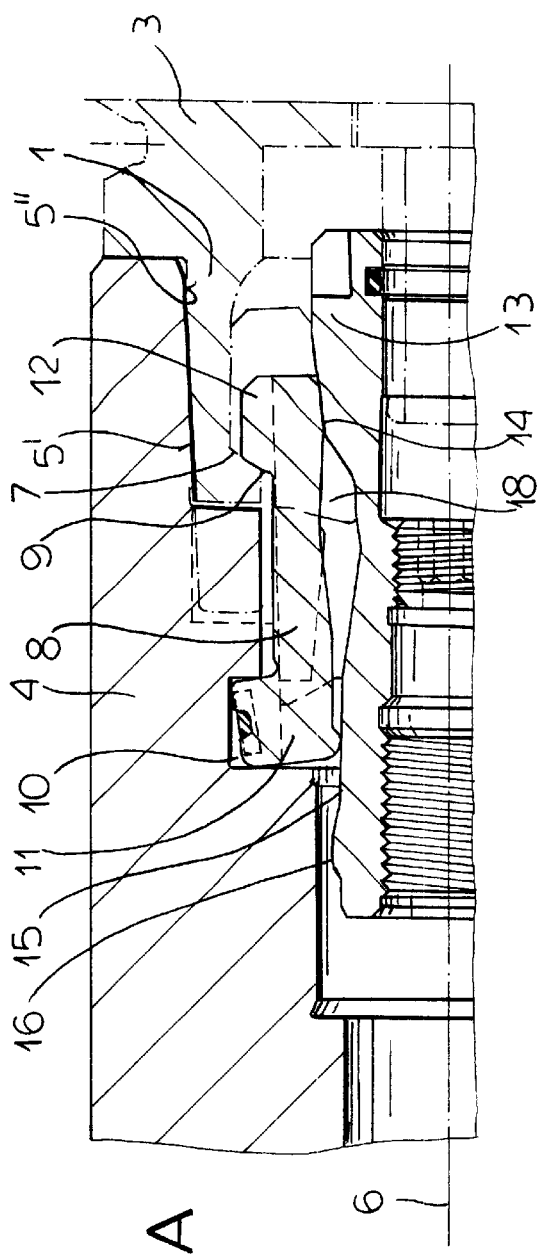
FIGS. 1A and 1B are axial sections through the collet chuck according to the invention in the holding and freeing positions, respectively.

As seen in FIG. 1 a collet chuck according to the invention is centered on an axis 6 and adapted to hold a workpiece 3 having a mounting collar 1 having a frustoconical outer surface 5' engaging a frustoconical inner surface 5" of a socket 2 of a chuck body 4 rotatable about the axis 6. The collar 1 also has an axially forwardly directed shoulder 7.

Figure 9A:
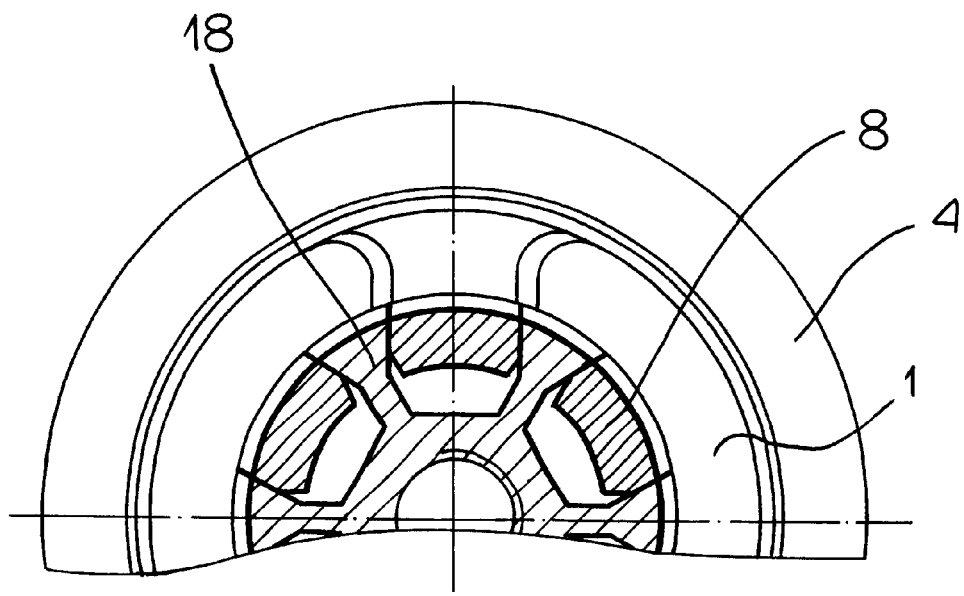
FIGS. 9A and 9B are views like respective FIGS. 8A and 8B but with a six- rather than a seven-jaw collet assembly.
Figure 9B:
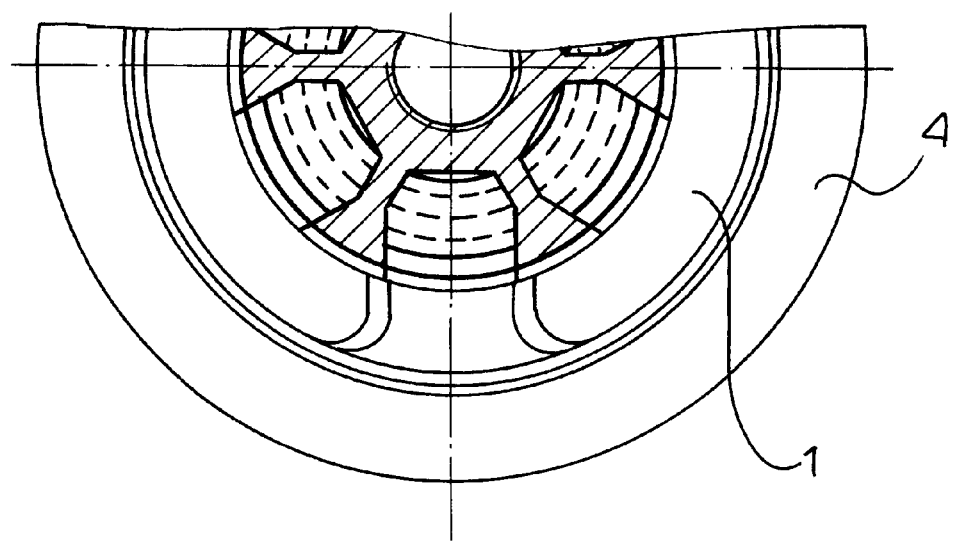

As also shown in FIGS. 5, 6, 7, 8A, and 8B a collet assembly 20 comprised of seven identical jaws 8 (a six-sided system being shown in FIGS. 9A and 9B) is provided inside the generally sleeve-like or tubular body 4. Each jaw 8 has a front end 12 with an axially rearwardly directed shoulder 9 engageable with the shoulder 7 and a rear end 11 received in a radially inwardly open groove 10 centered on the axis 6. The jaws 8 can rock about respective axes lying in a plane perpendicular to the axis 6 between the holding position of FIGS. 1A and 8A with the outer ends 12 in radial outer positions and the shoulders 9 engaging the shoulder 7 and the freeing position of FIGS. 1B and 8B with the outer ends 12 in radial inner positions and the mounting collar 1 free to move axially back into and forward out of the chuck body 4. During such rocking the rear ends 11 of the jaws 8 move radially oppositely to the front ends 12. A spring element 19 is set in radially outwardly open notches 21 of the rear ends 11 to urge the collet assembly 8 into the holding position with the front ends 12 spread. The jaws 8 are angularly spaced to form axially extending and radially throughgoing slots or gaps 22 with radially outwardly flared outer portions. The spring element 19 is an elastomeric ring and is formed with spacer blocks 23 that engage in the slots 22 and maintain a uniform spacing between adjacent jaws 8.

Figure 1C:
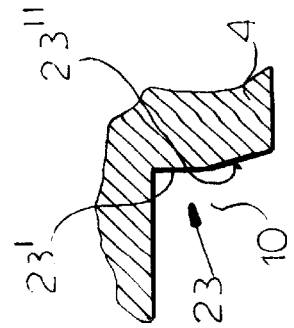
FIG. 1C is a large-scale view of a detail of FIG. 1A.
Figure 1B:
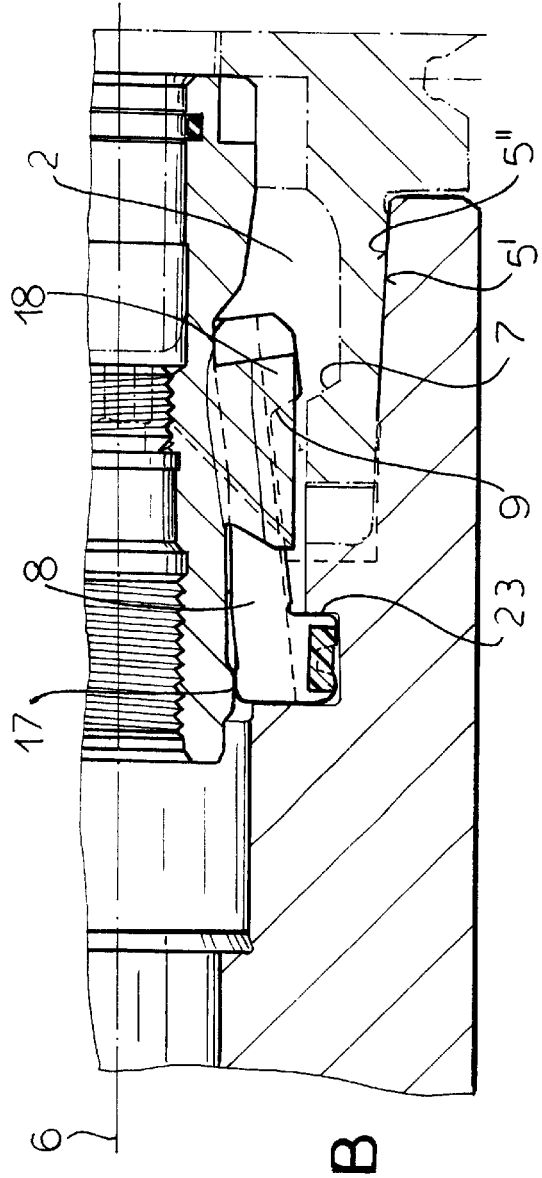
Figure 2:
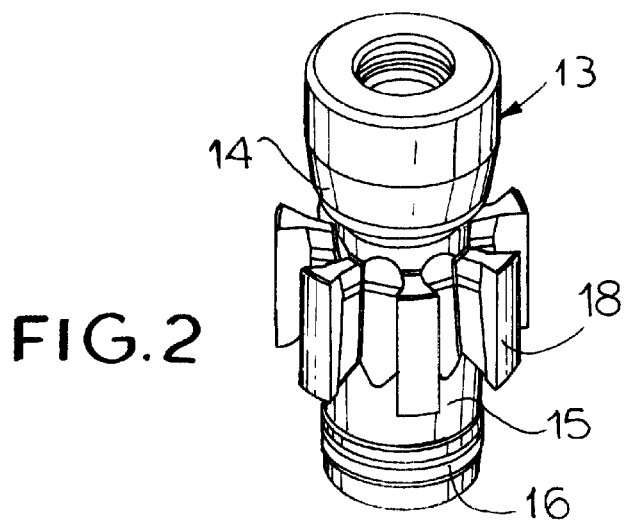
FIG. 2 is a perspective view of the cam sleeve.
Figure 3:
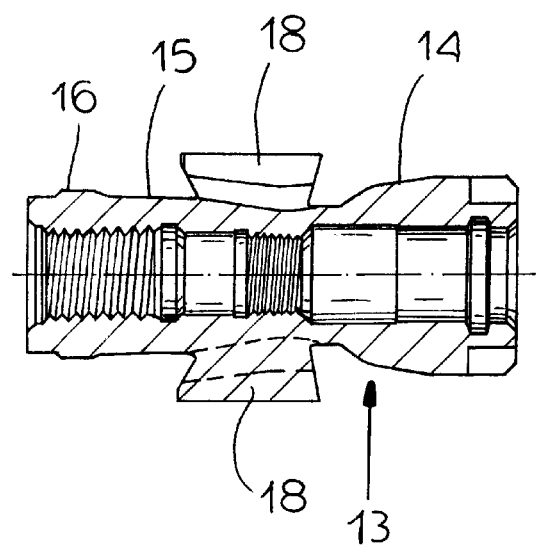
FIG. 3 is an axial section through the cam sleeve.
Figure 4:
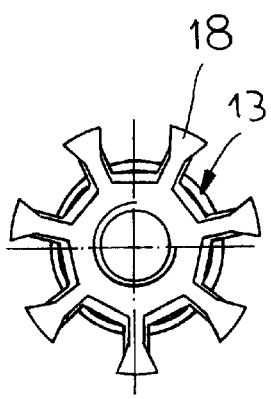
FIG. 4 is an end view of the cam sleeve.
Figure 5:
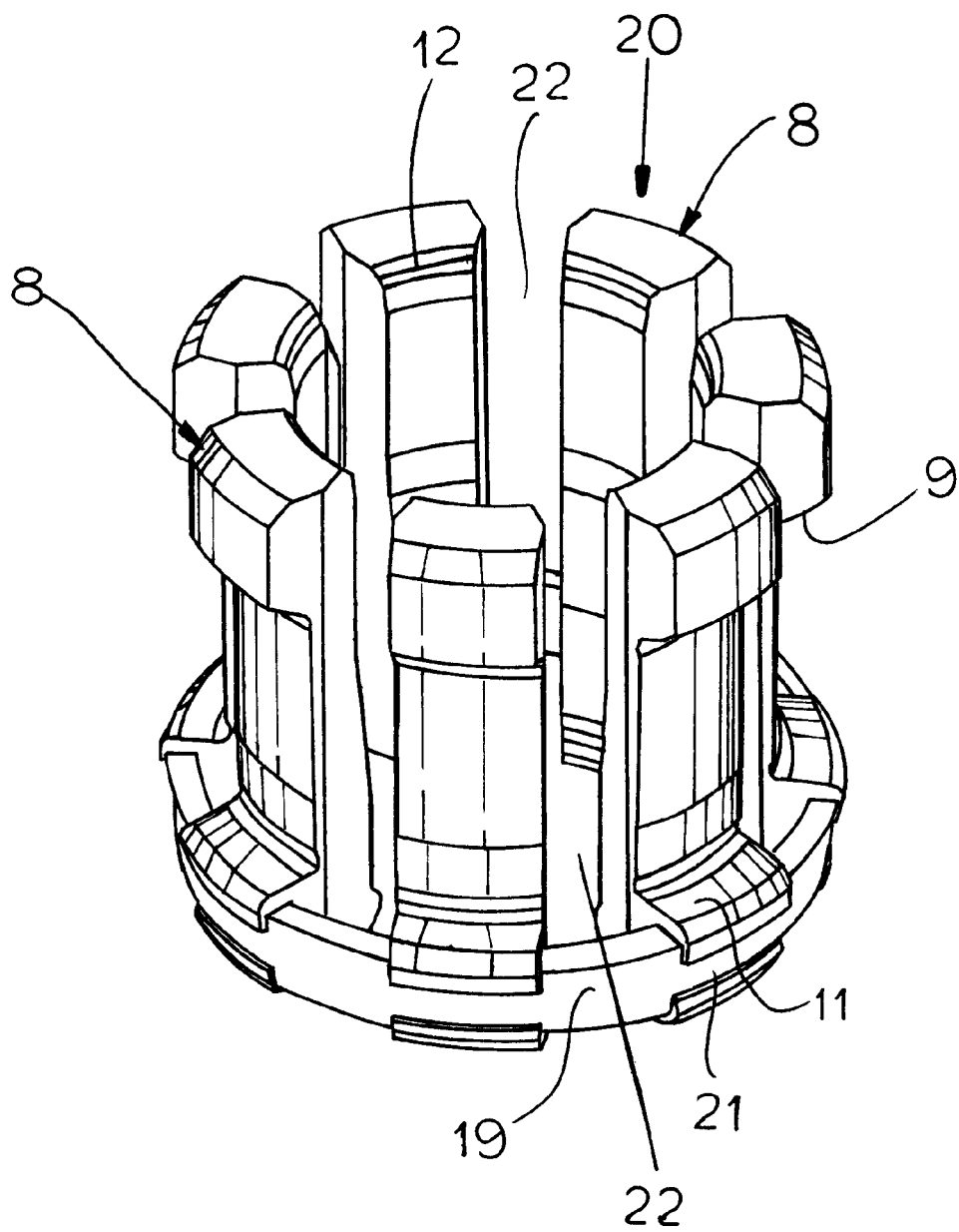
FIG. 5 is a perspective view of the collet assembly.
Figure 6:
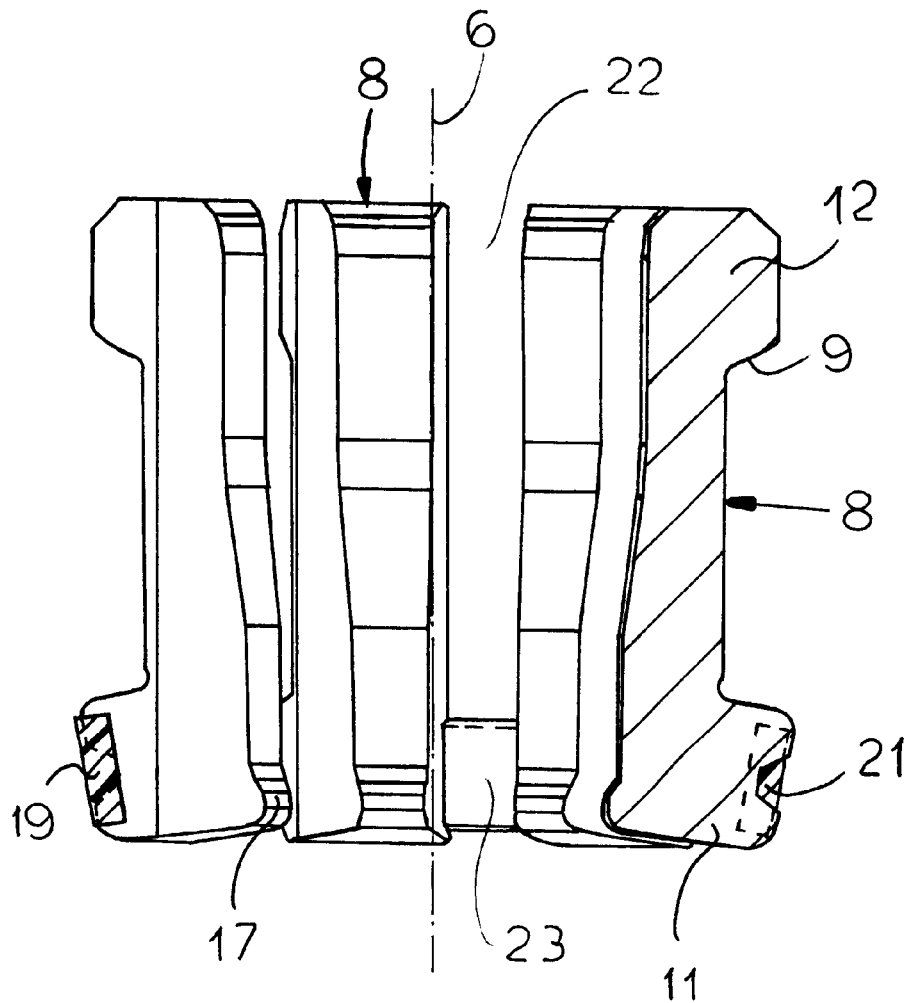
FIG. 6 is an axial section through the collet assembly.
Figure 7:
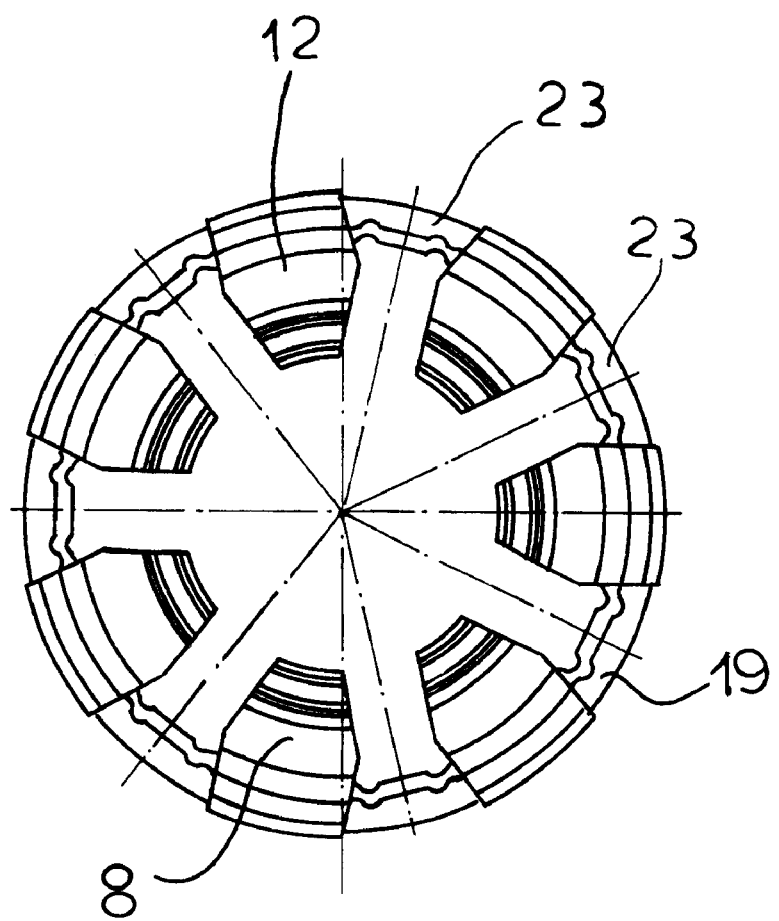
FIG. 7 is an end view of the collet assembly of FIG. 6.
Figure 8A:
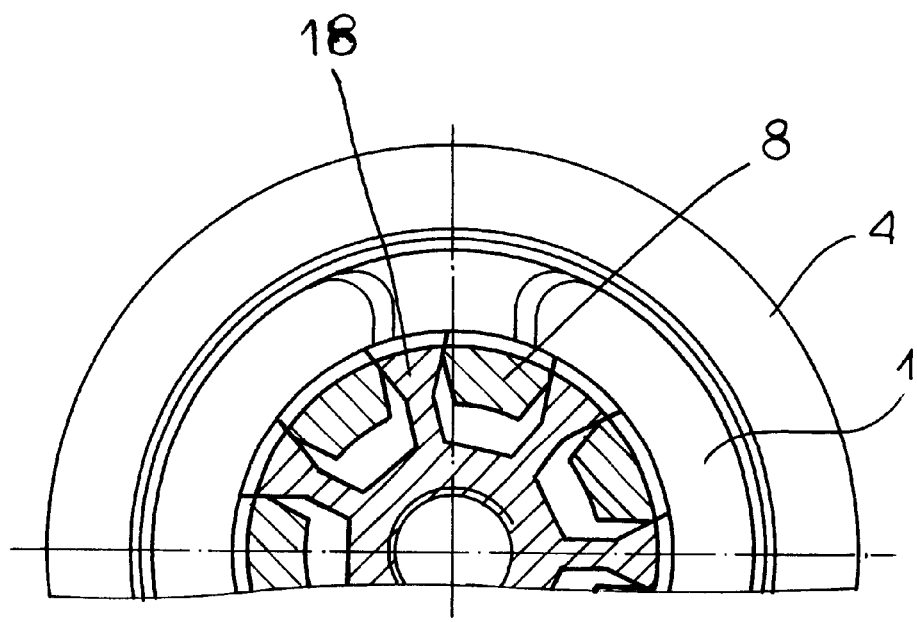
FIGS. 8A and 8B are cross sections showing the collet assembly in the holding and freeing positions.
Figure 8B:
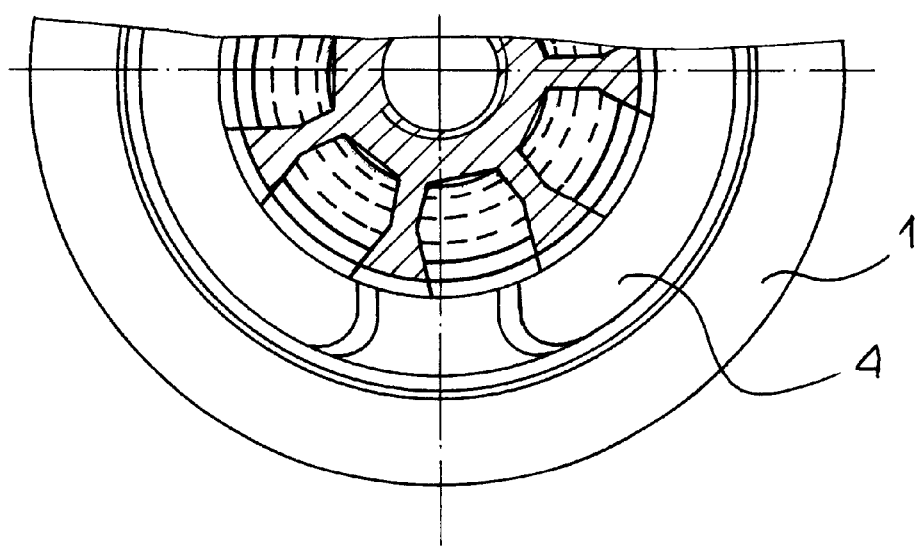

A position-setting collar or sleeve 13 is axially displaceable by an unillustrated actuator in the chuck body 4 and has a frustoconical front surface 14 engageable with inner faces of the front ends 12 and a frustoconical rear surface 15 engageable with inner faces of the rear ends 11. Thus when the sleeve 13 is pulled axially backward (to the left in FIGS. 1A and 1B), it will push the front jaw ends 12 radially outward to lock the chuck body 4 to the workpiece 3, and when pushed axially forward (to the right in FIGS. 1A and 1b), it will push the rear jaw ends 11 radially outward to release the workpiece 3. The sleeve 13 has a radially outwardly directed rearmost cylindrical surface 16 engageable with bumps 17 of the jaws 8 to hold them in the freeing position. The groove 10 has as shown in FIG. 1C a front flank 23 with an outer half 23' lying in a plane perpendicular to the axis 6 and an inner half 23" of frustoconical shape extending at 100 to the outer portion and flaring axially rearward.

In accordance with the invention the cam sleeve 13 is formed with seven angularly equispaced, axially extending, and radially outwardly projecting ribs 18 that fit complementarily into the gaps 22 between the jaws 8. Thus the sleeve 13 will remain centered on the axis 6 at all times. In addition the sleeve 13 will maintain equiangular spacing between adjacent jaws 8.

I claim:

1. A collet chuck for holding a mounting collar of an object to be rotated, the chuck comprising:
   a chuck body centered on and rotatable about an axis and formed with an axially forwardly open socket shaped to receive the collar;
   a plurality of jaws in the socket having front ends engageable inside the collar in the socket and rear ends offset axially rearwardly from the front ends, the jaws being angularly spaced and defining axially extending and radially inwardly open slots;
   a setting sleeve having a front cam surface engageable with inner faces of the front ends of the jaws, whereby the sleeve can cam out the front ends to lock the jaws to the collar in the socket, the sleeve being unitarily formed with radially outwardly projecting and axially extending ribs each received in a respective one of the slots and each of a shape fitting complementarily with the respective slot.

2. The collet chuck defined in claim 1 wherein the chuck body is formed axially rearward of the socket with a radially inwardly open groove centered on the axis and each jaw has a rear end received and radially displaceable in the groove, the setting sleeve having a rear cam surface engageable with inner faces of the rear ends of the jaws, whereby the sleeve can cam out the rear ends to move the front ends radially inward and axially clear of the collar in the socket.

3. The collet chuck defined in claim 2 wherein each of the ribs are of an angular dimension increasing outward from the axis.

4. The collet chuck defined in claim 2, further comprising means including a spring engaged around the rear ends of the jaws for urging the jaw front ends radially outward.

5. The collet chuck defined in claim 4 wherein the rear ends form a radially outwardly open groove receiving the spring.

6. The collet chuck defined in claim 5 wherein the spring has spacer blocks engaged in the slots and braced angularly against the jaws, whereby the spacer blocks angularly space and separate the jaws.

7. The collet chuck defined in claim 2 wherein the sleeve is formed axially rearward of the rear cam surface with a cylindrical holding surface centered on the axis and engageable with the jaw rear ends to retain same in a freeing position with the jaw front ends shifted inward.

8. The collet chuck defined in claim 2 wherein the groove has an axially rearwardly directed flank engaging the jaw rear ends.

9. The collet chuck defined in claim 8 wherein the flank has a radially outer portion lying substantially in a plane perpendicular to the axis and a frustoconical radially inner portion inclined at about 10° to the plane.

10. The collet chuck defined in claim 2 wherein the mounting collar has an axially forwardly directed shoulder and jaw front ends each have an axially rearwardly directed shoulder engageable axially with the collar shoulder.

11. A collet chuck for holding a mounting collar of an object to be rotated, the chuck comprising:
    a chuck body centered on and rotatable about an axis and formed with
      an axially forwardly open socket shaped to receive the collar and
      a radially inwardly open groove centered on the axis;
    a plurality of jaws in the socket having
      front ends engageable inside the collar in the socket and
      rear ends offset axially rearwardly from the front ends and received and radially displaceable in the groove, the jaws being angularly spaced and defining axially extending and radially inwardly open slots;
    a setting sleeve having
      a front cam surface engageable with inner faces of the front ends of the jaws and
      a rear cam surface engageable with inner faces of the rear ends of the jaws, whereby the sleeve can cam out the front ends to lock the jaws to the collar in the socket and can cam out the rear ends to move the front ends inward and axially clear of the collar in the socket, the sleeve being formed with radially outwardly projecting and axially extending ribs each received in a respective one of the slots; and means including a spring engaged around the rear ends of the jaws for urging the jaw front ends radially outward.

12. The collet chuck defined in claim 11 wherein the rear ends form a radially outwardly open groove receiving the spring.

13. The collet chuck defined in claim 12 wherein the spring has spacer blocks engaged in the slots and braced angularly against the jaws, whereby the spacer blocks angularly space and separate the jaws.

14. A collet chuck for holding a mounting collar of an object to be rotated, the chuck comprising:

a chuck body centered on and rotatable about an axis and formed with
an axially forwardly open socket shaped to receive the collar and
a radially inwardly open groove centered on the axis;

a plurality of jaws in the socket having
front ends engageable inside the collar in the socket and
rear ends offset axially rearwardly from the front ends and received and radially displaceable in the groove, the jaws being angularly spaced and defining axially extending and radially inwardly open slots;

a setting sleeve having
a front cam surface engageable with inner faces of the front ends of the jaws,
a rear cam surface engageable with inner faces of the rear ends of the jaws, whereby the sleeve can cam out the front ends to lock the jaws to the collar in the socket and can cam out the rear ends to move the front ends inward and axially clear of the collar in the socket, the sleeve being formed with radially outwardly projecting and axially extending ribs each received in a respective one of the slots, and a cylindrical holding surface centered on the axis axially rearward of the rear cam surface and engageable with the jaw rear ends to retain same in a freeing position with the jaw front ends shifted inward.

15. A collet chuck for holding a mounting collar of an object to be rotated, the chuck comprising:

a chuck body centered on and rotatable about an axis and formed with
an axially forwardly open socket shaped to receive the collar and
a radially inwardly open groove centered on the axis and having an axially rearwardly directed flank in turn having a radially outer portion lying substantially in a plane perpendicular to the axis and a frustoconical radially inner portion inlined at about 10° to the plane;

a plurality of jaws in the socket having
front ends engageable inside the collar in the socket and
rear ends offset axially rearwardly from the front ends, engageable with the groove rear flank, and received and radially displaceable in the groove, the jaws being angularly spaced and defining axially extending and radially inwardly open slots;

a setting sleeve having
a front cam surface engageable with inner faces of the front ends of the jaws and
a rear cam surface engageable with inner faces of the rear ends of the jaws, whereby the sleeve can cam out the front ends to lock the jaws to the collar in the socket and can cam out the rear ends to move the front ends inward and axially clear of the collar in the socket, the sleeve being formed with radially outwardly projecting and axially extending ribs each received in a respective one of the slots The collet chuck defined in claim 2 wherein the groove has an axially rearwardly directed flank engaging the jaw rear ends.

* * * * *